Patented Oct. 19, 1926.

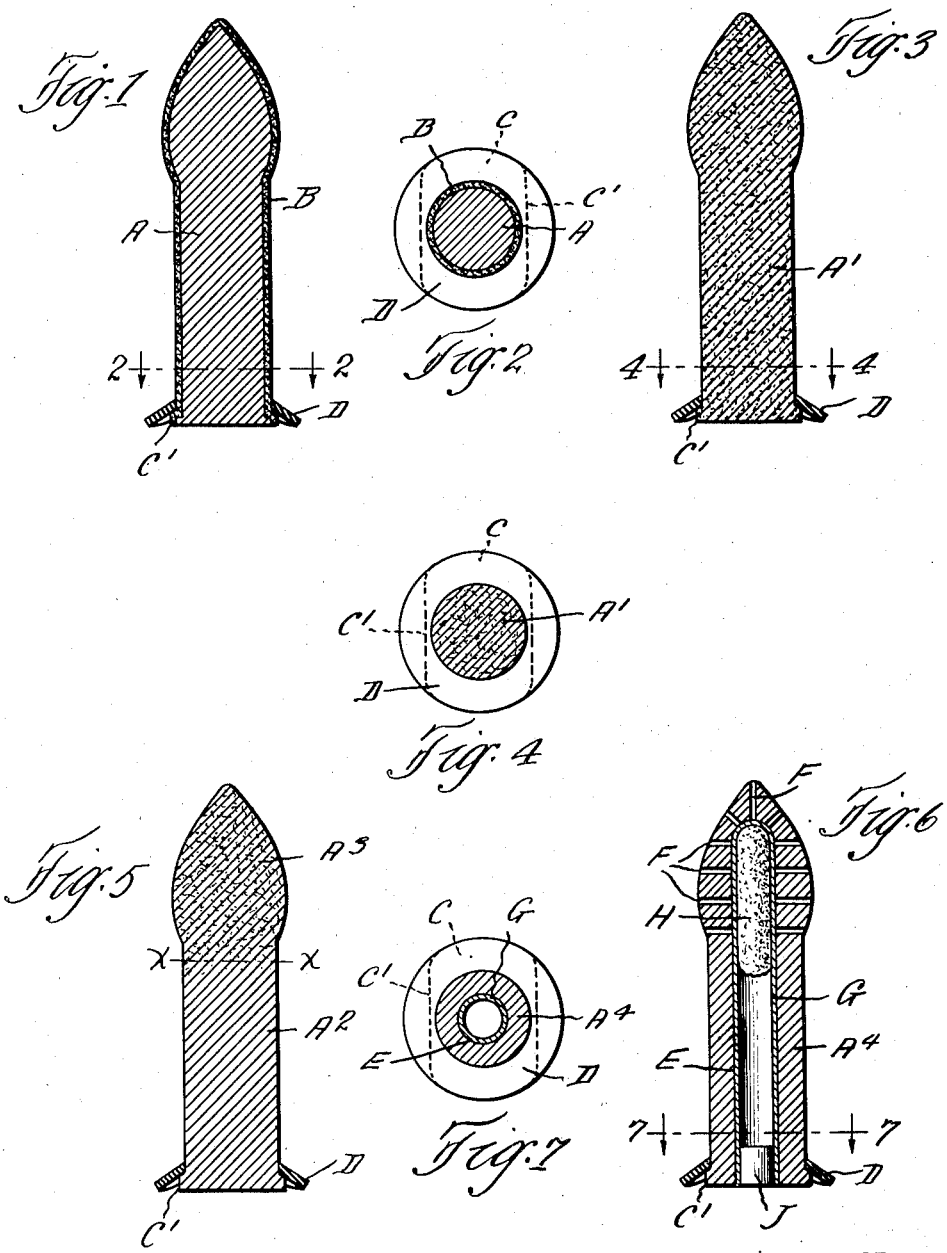

1,603,767

UNITED STATES PATENT OFFICE.

JOHN HARRIS, OF CLEVELAND, OHIO.

MEANS FOR TREATING ORGANS OF THE BODY.

Application filed March 12, 1926. Serial No. 94,113.

This invention relates to means, preferably in the form of a suppository applicator, for treating glands or organs of the human body. It is the general purpose and object of the invention to provide a means or instrument which will enable the rectum, vagina, colon, and glands or organs adjacent thereto to be treated in an efficient manner.

In the drawings forming part hereof, there is shown an instrument, in the form of an applicator, which is specially designed for the purposes recited. Referring to the views in said drawings, Fig. 1 represents a central longitudinal section thru an applicator constructed in accordance with my invention and Fig. 2 a detail in section corresponding to the line 2—2 of Fig. 1; Fig. 3 is a view, similar to Fig. 1, showing a modified form of my invention, while Fig. 4 is a detail in section corresponding to the line 4—4 of Fig. 3; Fig. 5 is a view, similar to Figs. 1 and 3, and representing a still further modification of my invention; Fig. 6 is a view, similar to Figs. 1, 3 and 5, of a further modification of my invention; and Fig. 7 is a detail in section corresponding to the line 7—7 of Fig. 6.

In the practice of my invention, I employ an applicator in the form of a suppository and of a size which will enable the same to be applied to the rectum or vagina, as the case may be, the said applicator containing or having combined or associated therewith radio-active material in proper strength to enable the parts to be treated to be warmed slightly and given the effect of a massage by the action of such radio-active material but without burning or breaking down the tissues. The radio-active material may be any of the well known radio-active elements or compounds of such elements, instances of such radio-active materials being the oxides, nitrides, or sulphides of uranium and thorium, or combinations of such elements and compounds; in fact, any of the well known radio-active elements or compounds thereof may be used, either alone or in combination with one another, it being essential that they be used in the proper strength to secure the warming and massaging effects referred to without burning or breaking down the tissues. For the purpose of securing such proper strength, I have prepared a composition including such radio-active material in the following manner:—To five pounds of thorium oxide, uranium oxide, or ground cornatite, pitchblende, or other radio-active material the equivalent of uranium in strength, I have added one milligram of pure radium chloride for the purpose of building up the strength of the said material. Where it is desired to produce a suppository applicator having the head part $A_3$ impregnated with a radio-active material, as shown in Fig. 5, about one gram of the foregoing is added to and mixed with about one-fourth of an ounce of rubber, and the resulting compound is then molded to shape and vulcanized. Substantially the same proportions of radio-active material to rubber will be used in producing all forms of my invention, except that shown in Fig. 6 hereafter.

In Fig. 1 of the drawings, I have shown an applicator, consisting of a body A in the shape of a suppository, the said body being preferably of hard rubber and having applied thereto a coating B of radio-active material. In forming the applicator, the body A is first molded to the appropriate form and is then dipped into a molten mass of hard-rubber mixture with which the radio-active material is mixed. In this manner, the proper proportion of radio-active material for the particular treatment is readily obtained, and the material is spread over the entire surface of the applicator, with the exception of the bottom thereof. After the dipping operation, the coated surface may be smoothed off, by buffing or other suitable treatment.

It will be noted that the base of the applicator is provided with a flange C the sides of which are narrowed at C' to a width only slightly greater than the diameter of the body of the applicator. This shoulder forms a seat for a washer D of rubber or other pliable material. The shape of the flange C, C', enables the applicator and washer to be worn without discomfort.

In Figs. 3 and 4, there is shown another form of my invention in which the applicator consists of a body A' of the full size of the applicator, the said body consisting of a mixture of rubber and radio-active material in proper proportions. In this case, the radio-active material is disseminated thruout the entire body. The applicator is provided with the washer D and flange C, C', as in the case with the applicator shown in Figs. 1 and 2.

In Fig. 5 there is shown a modification of the invention which is adapted for the treatment of glands or other parts at a distance above the bottom of the applicator. In this embodiment of my invention, the lower part $A_2$ of the applicator is molded from ordinary hard rubber, up to about the line X—X, the upper part $A_3$ of the body being formed by pouring into the mold a mixture of such rubber with the radio-active material.

In Fig. 7 there is shown a still further modification of my invention, wherein the applicator body is of the same shape as in the preceding views, being formed preferably of hard rubber, and being provided with a bore E extending upwardly from the bottom to a point adjacent the top thereof. This form of the applicator is intended for the treatment of parts or organs at a considerable distance above the bottom of the applicator, the somewhat enlarged head of the applicator being provided with bores F extending outwardly from the upper part of the bore E. The bore E is provided with a lining G of material which will allow the passage therethru of the radio-active particles, due to the disintegration of the atoms, while retaining the mass of radio-active material H therein during such disintegration. A suitable material for the liner G is mica. The bottom of the bore of the liner is shown as closed by a removable plug J.

With an applicator coated with, or having combined therewith, radio-active material thruout the full length thereof, the radio-active material will operate upon the corresponding length of the rectum or vagina and the parts adjacent thereto—for instance, the prostate gland, bladder and uterus. The length of the part of the applicator body which is so treated may be varied in accordance with the particular organ or part to be treated. For instance, in case of piles, only the lower part need be treated.

When the applicator is in place, the radio-active material, being warmer than its surroundings due to the disintegration of its atoms, produces a slight infra red ray and a slight electrical current, with a warming of the parts to be treated, while the alpha rays and the beta rays give a slight massaging effect by bombardment of the parts against which they impinge. In addition, the parts are subjected to the action of a slight amount of electromagnetic waves in the form of gamma rays.

The form and dimensions of the applicator and the material of which it is composed may be varied to suit the conditions of any particular case, the form shown herein being suitable for use in dilating the anus and in treating the rectal or vaginal cavities, the colon, and the organs adjacent thereto such as the prostate gland, bladder and uterus.

Having thus described my invention, what I claim is:

1. An applicator comprising a body in the form of a suppository having an external coating consisting of a mixture of radio-active material with a base of material capable of adhering to said body.

2. An applicator comprising a body in the form of a suppository having an external coating consisting of a mixture of radio-active material with a rubber base.

3. An applicator in the form of a suppository having an external coating of a mixture of radio-active material with plastic material.

4. An applicator in the form of a suppository and having a rounded upper end the external part of which consists of radio-active material mingled with a rubber base and molded to shape and vulcanized.

In testimony whereof, I hereunto affix my signature.

JOHN HARRIS.